United States Patent [19]

Min et al.

[11] Patent Number: 5,508,087
[45] Date of Patent: Apr. 16, 1996

[54] ORGANIC-OPTIC RECORDING TAPES

[75] Inventors: Kyung S. Min, Seoul; Geon Y. Kim; Ok K. Cho, both of Kyungki-do, all of Rep. of Korea

[73] Assignee: Cheil Synthetics Inc., Kyungasangbuk-Do, Rep. of Korea

[21] Appl. No.: 249,697

[22] Filed: May 26, 1994

Related U.S. Application Data

[63] Continuation of Ser. No. 998,383, Dec. 30, 1992, abandoned.

[30] Foreign Application Priority Data

May 30, 1992 [KR] Rep. of Korea ............... 92-9352

[51] Int. Cl.$^6$ ............................................. B32B 9/00
[52] U.S. Cl. ..................... 428/195; 369/100; 369/283; 369/284; 369/289; 369/275.2; 369/275.4; 428/64.1; 428/913; 428/409
[58] Field of Search ............................. 428/64, 409, 65, 428/195, 913; 346/135.1; 369/272, 273, 274, 275, 276, 277, 278, 279, 280, 288, 292, 100, 284, 289, 283; 430/945; 525/439; 546/8

[56] References Cited

U.S. PATENT DOCUMENTS

| | | | |
|---|---|---|---|
| 4,161,498 | 7/1979 | Bopp | 525/439 |
| 4,719,615 | 1/1988 | Feyrer | 346/135 |
| 4,860,273 | 8/1989 | Sawano | 369/100 |
| 4,879,709 | 11/1989 | Clark | 430/945 |
| 4,889,756 | 12/1989 | Barzynski | 428/64 |
| 4,937,338 | 6/1990 | Flohr et al. | 546/8 |
| 5,013,594 | 5/1991 | Mizumura et al. | 428/65 |
| 5,169,744 | 12/1992 | Leenders et al. | 430/945 |
| 5,213,955 | 5/1993 | Hamada et al. | 430/945 |

OTHER PUBLICATIONS

Encyclopedia of Polymer Science and Engineering, vol. 2, pp. 390–434, John Wiley & Sons, 1989.

*Primary Examiner*—Patrick J. Ryan
*Assistant Examiner*—Patrick Jewik
*Attorney, Agent, or Firm*—Merchant, Gould, Smith, Edell, Welter & Schmidt

[57] ABSTRACT

An organic-optic recording tape of higher capacity and higher packing density of data. This tape comprises a backcoating layer, a base film coated on the backcoating layer, and a complex functional layer for writing, reading and erasing data. The complex functional layer is coated on the base film and selectively focused by laser beams of different powers outputted from a laser diode in order to write, read or erase data. This complex functional layer is made of a block polymer prepared by blending a thermoplastic elastomer and a viscoelastic transparent thermoplastic high-molecular resin or polymerizing them. Near infrared absorbing organic colorants are dispersed in the complex functional layer. The transparent thermoplastic resin has a glass transition temperature higher than that of the elastomer. The recording is effected by employing a laser beam of lower power capable of inducing thermal expansion of the elastomer and formation of a bump. The erasing is effected by employing a laser beam of higher power capable of inducing viscousness of the resin. The reading is effected by employing a laser beam of very lower power capable of causing reflectivity difference between the bump and the normal part of the complex function layer.

10 Claims, 1 Drawing Sheet

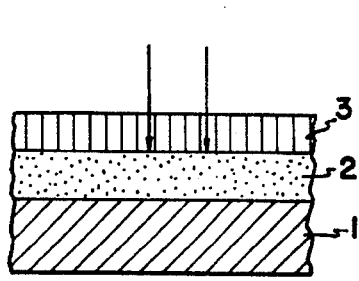
FIG. IA
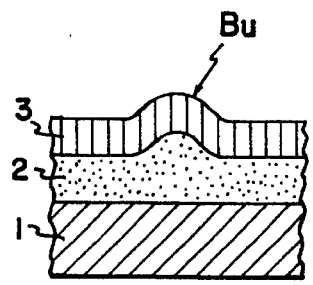
FIG. IB
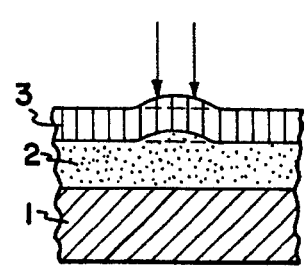
FIG. IC
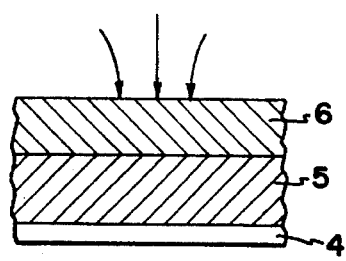
FIG. 2A
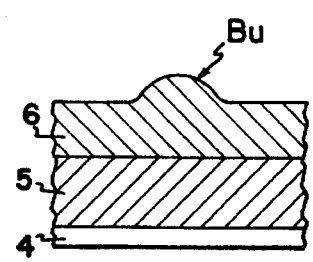
FIG. 2B
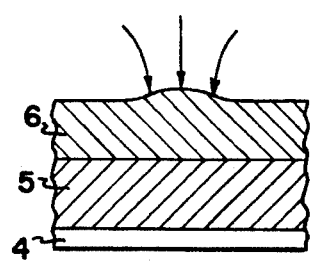
FIG. 2C

ORGANIC-OPTIC RECORDING TAPES

This is a continuation of application Ser. No. 07/998,383, filed Dec. 30, 1992 now abandoned.

BACKGROUND OF THE INVENTION

1. Field of the Invention

The present invention relates in general to an organic-optic recording tape for writing, reading, erasing and rewriting information by employing laser beams and, more particularly, to an organic-optic recording tape of higher capacity and higher packing density of data, suitable for used in a recording medium for several kinds of information including image information.

2. Description of the Prior Art

In recent, the computer industry has generated an enormous and continually increasing demand for data storage associated with highly informationized society. This demand has necessarily encouraged the continued development of recording media of higher capacity, higher packing density of data and rapid access time. In order to achieve such recording media, there has been proposed a magnetic medium which permits the information to be recorded along a direction of magnetization of its magnetic recording layer, i.e., the longitudinal direction of the magnetic recording layer. Such a magnetic medium is practically used for, for example, video tapes, audio tapes, floppy discs and etc.

The demand for data storage has also encouraged the development of a recording medium having not only higher capacity but also desirable compact size and, as a result, the development of a magneto-optic recording medium. In this magneto-optic recording medium, the magneto-optic recording layer is magnetically polarized iñ vertical direction on the recording layer as opposed to the aforementioned magnetic medium. In addition, this magneto-optic recording medium has intensive coercive force, maintaining the direction of magnetization, of about 5 to 10 times that of the above magnetic medium and this makes it difficult to change the direction of magnetization by outside magnetic field. In this respect, in order to change the direction of magnetization of the magneto-optic layer, it is required to focus a laser beam on the recording layer such that the laser beam has a very small focused spot of 1 µm or less in diameter and heats the recording layer locally to a temperature not less than the Curie temperature of the layer. At this state, outside magnetic field is employed so as to change the direction of magnetization. Hence, it is possible to record the information on the recording layer along the changed direction of magnetization. In accordance with such a magneto-optic recording, information recording unit on the recording layer is micronized to 1 µm or less in diameter and, in this respect, provides higher packing density of data of about 10 to 1000 times that of the conventional magnetic recording. In addition, this magneto-optic recording allows the information to be read by employing non-contact reading, thereby facilitating data preservation and lengthening the using life of the recording medium.

However, a disadvantage of this magneto-optic recording is resided in that its recording medium necessarily uses magnetic materials of heavy metals and employs physical vapor deposition process, such as vacuum evaporation or sputtering, in its preparation and, as a result, has serious difficulty in the preparation process. In an effort to provide recording media overcoming the above disadvantage of the magneto-optic recording medium, there has been proposed organic-optic recording media. These organic-optic recording media are generally classified into two types in consideration of whether they are erasable and rewritable. Otherwise stated, one type is so-called WORM (Write Once Read Many) type organic-optic recording media which permit the information to be wrote once and read many times while the other type is so-called rewritable type organic-optic recording media which permit the information to be erased and rewritten if necessary.

Each of the WORM type recording media includes a substrate coated with a reflection layer and a recording layer deposited on the substrate. In order to provide the recording layer, laser absorbing colorants mixed with a high-molecular resin is deposited on the substrate. In addition, A preservation layer is coated on the recording layer. The recording of data on such a WORM type recording medium is effected by directing a laser beam to the recording layer in order to form a small focused laser spot of 1 µm or less in diameter. Hence, the laser absorbing colorants of the recording layer absorb the laser beam and generate heat which causes the high-molecular resin as well as the laser absorbing colorants to be melted or decomposed in order to form a pit. As a result, the information can be recorded on the recording medium. The reading of data (logic 1 or logic 0) is effected by reflectivity difference between the pits and the normal part of the medium. In this WORM recording medium, it is impossible to erase and rewrite the information since the recording part of the medium, i.e., the pits, has the form of decomposition of the high-molecular resin.

Meanwhile, the recording layer of the rewritable type organic-optic recording medium is prepared by dispersing colorants in an organic high-molecular resin. The recording of the information on this type of recording medium is effected by directing the laser beam to the recording layer in order to thermally expand the organic high-molecular resin and to form a bump on the recording layer and, thereafter, by maintaining the bump as it was. This rewritable type recording medium using organic colorants has been disclosed, for example, in U.S. Pat. No. 4,719,615 to Feyrer el al. (Optical Data Inc.) which will be described hereinbelow in conjunction with FIGS. 1A to 1C.

As shown in these drawings, this recording medium is an optical data storage disc having three-layer construction. Otherwise stated, this optical disc includes a substrate 1 and a dual layer deposited on the substrate 1, the dual layer having a bottom layer or a recording layer 2 of one material and a top layer or an rewritable layer 3 of another material.

The substrate 1 is made of a transparent resin, such as polycarbonate or polymethacrylate. In addition, the recording layer 2 is made of an elastic high-molecular resin and laser absorbing colorants, while the rewritable layer 3 is made of a thermoplastic high-molecular resin and laser absorbing colorants. The recording of the information on the recording layer 2 is effected by directing a recording laser beam to the layer 2 in order to cause the laser absorbing colorants to absorb the laser beam and generate heat for thermally expanding the high-molecular resin. The thermal expansion of the resin causes irreversible deformation of the rewritable layer 3 and, as a result, forms a bump. After the laser scanning, the rewritable layer 3 rapidly cools down as it was. As a result, the bonding force between the two layers 2 and 3 overcomes restoring force of the elastic resin of the recording layer 2. In this respect, this recording layer 2 is prevented from restoring its initial plane shape due to the bonding force and the bump shape of the rewritable layer 3, thereby maintaining the bump Bu as it was as represented in FIG. 1B. The reading of the information is effected by directing a reading laser beam, having less intensity than that of the recording laser beam, on the optical disc. This recording laser scanning results in reflectivity difference between the bumps and the normal part of the recording layer 2 and this allows the information to be read from the layer 2, for example, in such a manner that the information of logic 1 is read from the bump BU while the information of logic 0 is read from the normal part. In order to erase the information, an erasing laser beam is focused on the rewritable layer 3 and absorbed by the colorants of the layer 3. When these colorants absorb the laser beam, they generate heat for heating the rewritable layer 3 to a temperature not less than a glass transition temperature Tg of the layer 3. The resisting force against the restoring force of the elastic high-molecular resin of the recording layer 2 is, therefore, reduced and, as a result, the recording layer 2 restores its initial plane shape as represented in FIG. 1C.

Examples of the laser beam absorbing colorants, that can be used in the recording and rewritable layers 2 and 3 are phthalocyanines, carbon blacks, azos (monoazo and diazo), anthroquinones, nigrosenes and xanthenes. In order to carry out the optical writing, reading, erasing and rewriting of data on the optical data storage disc, it is required to provide an electro-optical system including a pair of variable-intensity lasers for outputting individual laser beams, a pair of collimating lenses for collimating the laser beams, a reflection mirror, a beam splitter, an objective lens and etc.

However, this known optical recording technology such as disclosed in the above U.S. Patent, while being applicable to the organic-optic recording which is associated with this invention, nevertheless has a disadvantage in that it requires the pair of variable-intensity lasers for recording and erasing of data and, as a result, necessarily has a complex construction which resists to the recent trend of compactness of the practical electro-optical system. Another disadvantage of the above known technology is resided in that the data storage capacity is restricted due to the limited recording area of the data storage disc. In addition, the preparation process for the disc according to this known technology requires two coating steps and two drying steps for providing the dual layer having the recording and rewritable layers. In coating the rewritable layer on the recording layer, it is required to satisfy properties, running counter to each other, for providing desired bonding force between the two layers with no damage of the recording layer and, furthermore, to disperse different colorants in the recording and rewritable layers. In this respect, the preparation process for the disc is very complex.

SUMMARY OF THE INVENTION

It is, therefore, an object of the present invention to provide an organic-optic recording tape in which the above disadvantages can be overcome and which has higher data storage capacity, allows an electro-optical system to be provided with only one laser diode as a laser source and, as a result, to have a simple construction, facilitates formation of bump and employs a complex functional layer capable of substituting for both the recording layer and the rewritable layer of the prior art, thereby improving the properties of the recording medium and simplifying the preparation process for the medium.

In accordance with an embodiment of this invention, the above object is accomplished by providing an organic-optic recording tape comprising a backcoating layer, a base film and a complex functional layer which are deposited on the backcoating layer in order, the complex functional layer being made a block polymer prepared by blending a thermoplastic elastomer with a viscoelastic transparent thermoplastic high-molecular resin or polymerizing them.

BRIEF DESCRIPTION OF THE DRAWINGS

The above and other objects, features and other advantages of the present invention will be more clearly understood from the following detailed description taken in conjunction with the accompanying drawings, in which:

FIGS. 1A to 1C are sectional views showing a construction of an optical data storage medium according to prior art, in which:

FIG. 1A shows a normal state;

FIG. 1B shows a data record mode; and

FIG. 1C shows a data erase mode;

FIGS. 2A to 2C are views corresponding to FIGS. 1A to 1C, respectively, but showing an organic-optic recording tape of the present invention.

DETAILED DESCRIPTION OF THE PREFERRED EMBODIMENTS

With reference to FIGS. 2A to 2C showing a sectioned construction of an organic-optic recording tape of this invention, the tape includes a base film 5 and a complex functional layer 6 which are deposited on a backcoating layer 4 in order. The backcoating layer 4 is adapted to not only reduce frictional force of the tape for improving running performance of the tape, but also preserve a bump of the complex functional layer 6 when the tape is wound about a reel. In this respect, it is preferred to make this layer 4 using a soft polyurethane resin or a fluoride resin of 1 μm or less in thickness. The base film 5 is preferably made of polyethylene terephthalate (PET) or polyethylene naphthalate (PEN) to have a thickness of 10 μm or less. In order to achieve the object of this invention, the complex functional layer 6 has properties of higher thermal expansion modulus, lower thermal conductivity, sufficient elasticity and higher thermal decomposition. From the viewpoint of the above, it is preferred to make this layer 6 using a block polymer prepared by blending a thermoplastic elastomer A with a viscoelastic transparent thermoplastic high-molecular resin B or polymerizing them. The desired complex function of the layer 6 is achieved by combining individual properties of the resins A and B with each other. In this regard, the thermoplastic elastomer A preferably has a melting point not lower than 200° C. and a glass transition temperature not higher than 0° C., and shows viscoelasticity in a temperature range from the room temperature to 200° C. The transparent thermoplastic high-molecular resin B preferably has a melting point not lower than 200° C. and a glass transition temperature ranged from 130° C. to 150° C. In addition, colorants are used in the complex functional layer 6 so as to absorb a recording laser and generate heat and, in this respect, required to show higher modulus of light absorption and higher thermal stability. It is preferred to add these colorants of 2–25% by weight of the block polymer.

In accordance with this invention, the problem of the limited data storage capacity of the known optical recording disc is overcome by the organic-optic recording tape having the complex functional layer 6 permitting data to be wrote thereon and read therefrom. Due to the characteristic properties of the layer 6, the present invention also allows writing, erasing and reading of data to be carried out by controlling output power of a variable-intensity laser source. Otherwise stated, the laser source is controlled in its output power such that it outputs a laser beam of 5–7 mW in write mode, a laser beam of 10–12 mW in erase mode and a laser beam of 1–3 mW in read mode. When one of the laser beams of different output powers is focused on the complex functional layer 6, the colorants dispersed in the layer 6 absorb the laser beam and selectively generate heat. Hence, these colorants control the temperature of the complex functional layer 6 and allow the combined properties of the resins A and B to show a property responding to the temperature and to achieve a desired mode, i.e., the write mode, the read mode or the erase mode. Hereinbelow, theory of this invention will be described in detail.

As described above, the block polymer of the complex functional layer 6 consists of the thermoplastic elastomer A and the viscoelastic transparent thermoplastic high-molecular resin B which are uniformly distributed. Here, the resins A and B have lower thermal conductivities and higher thermal expansion moduli, respectively. Especially, the elastomer A has thermal properties of the glass transition temperature not higher than 0° C. and the melting point Tm not lower than 200° C. and exhibits a desired elasticity at the room temperature.

This elastomer A shows relatively higher elasticity modulus at the room temperature and is gradually reduced in its elasticity modulus as the temperature rises. Hence, when this elastomer A is heated to a temperature not higher than its melting point of 200° C., it is elastically deformed with restoring force sufficient to restore its normal state.

Meanwhile, the thermoplastic resin B is an amorphous material. In this regard, this resin B is transparent and abruptly changes its modulus at its glass transition temperature. That is, this resin B has a higher modulus of about $5.4 \times 10^7$ pascal at a temperature not higher than its glass transition temperature and shows viscoelastic deformation when it is heated. The modulus of this resin B is rapidly reduced at a temperature higher than its glass transition temperature. This means that the resin B is viscoelatically deformed at a temperature not higher than its glass transition temperature with no restoring force and viscously deformed at a temperature not lower than its glass transition temperature.

In accordance, the recording of data on the complex functional layer 6 is effected by focusing the laser beam of 5–7 mW power on the layer 6. The colorants dispersed in the layer 6 absorb the laser and generate heat for heating the layer 6 to a temperature of 110°–120° C. At this temperature, the elastomer A of higher thermal expansion modulus is thermally expanded and deformed while the thermoplastic resin B viscoelastically deformed with no restoring force. After the laser beam has been scanned to the layer 6 for several ten nsec., the complex functional layer 6 rapidly cools and this allows a bump Bu to be formed on the layer 6 as represented in FIGS. 1A and 1B. Here, this bump Bu stores data of, for example, logic 1. At this time, since the thermoplastic resins A and B of the layer 6 have lower thermal conductivities and higher thermal expansion moduli, respectively, as described above, only the focused spot part of the layer 6 is thermally expanded. In order to erase data from the layer 6, the laser source is controlled to output the laser beam of 10–12 mW power, thereby causing the complex functional layer 6 to be heated to a temperature of 150°–160° C. This temperature of 150°–160° C. is higher than the glass transition temperature of 130°–150° C. of the resin B but lower than the melting point of the elastomer A and this means that the resin B shows viscosity and the elastomer A shows elasticity at this temperature. Hence, the bumped layer 6 restores its normal state as represented in FIG. 2C. Meanwhile, the reading of data is effected by controlling the laser source to focus the laser beam of 1–3 mW power on the layer 6. This laser beam power of 1–3 mW is not sufficient to damage the bump Bu of the layer 6 and, in this regard, allows data to be read from the layer 6 with no damage of the bump Bu.

This reading of data is carried out due to different reflectivity between the bumped part, or the recorded part, and the normal part of the layer 6. That is, there happens laser scattering at the bumped part and this causes the reflectivity of the bumped part to be lowered than that of the normal part and, as a result, data to be read from the layer 6.

As described above, according to the present invention, an organic-optic recording material is applied to a tape in order to overcome the problem of limited data storage capacity of the known optical recording disc. All of the recording, reading and erasing of data are effected by focusing laser beams of different powers, outputted from a common laser source, on a complex functional layer of the organic-optic recording tape, thereby accomplishing the recent trend of compactness of the electric-optical system. The complex functional layer is made of a block polymer prepared by blending or polymerizing two kinds of thermoplastic resins of different properties and includes near infrared colorants, such as anthroquinones, phthalocyanines, nigrosenes and nitroso, capable of generating heat upon absorbing a light beam of laser wavelength. In this regard, the preparation process for this organic-optic recording tape requires only one coating step, thereby reducing manufacturing cost as well as manufacturing time. Additionally, the recording and reading of data are effected by employing non-contact, single-wavelength laser beam, thereby improving data preservation. The colorants dispersed in the complex functional layer absorb the laser and make it possible to record, erase and read data, thereby improving its efficiency.

The following examples are merely intended to illustrate the present invention in further detail and should by no means be considered to limitative of the scope of the invention.

EXAMPLE 1

Soft urethane layer of 1 μm thickness was coated, using a gravure coater, on a PET film of 14.5 μm (a video tape film of Cheil Synthetics Inc., Korea) in order to provide a backcoated PET film. On the backcoated PET film, a recording layer was coated in following manner.

0.5 g of NK 2014 (referred to following structural formula) of cyanides of Japanese photosensitive colorants was dissolved in 160 ml of $CHCl_3$. In order to form a complex functional layer, 10 g of thermoplastic polyester (of Cheil Synthetics Inc.; FSREL 1050 grade) was blended with 5 g of polycarbonate (of Polyscience Inc., molecular weight: 32,000–36,000). The colorant solution was then dispersed in the blended polymer which was, thereafter, coated on the backcoated PET film using the gravure coater in order to form the complex functional layer of 3.5 μm thickness on the PET film, thereby providing an organic-optic recording tape. A laser beam of 7 mW power outputted from a laser diode of 830 nm wavelength was focused on the complex functional layer for 0.1 μsec (micro second) in order to form a bump on the complex functional layer and write data. This bump had about 0.9 μm of diameter and about 0.15–0.18 μm of height. Thereafter, the laser diode was controlled to output a laser beam of 11 mW power which was focused on the complex functional layer for 0.3 μsec so as to erase data recorded on the layer. In accordance with measurement of surface roughness of the complex functional layer using a surface measuring instrument, the surface roughness was confirmed as same as before recording.

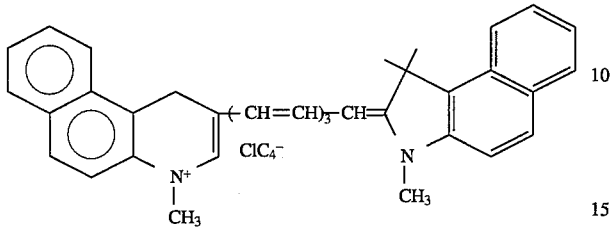

EXAMPLE 2

NaOH was added to Polyester elastomer having hydroxylic terminal groups (of Sunkyung Inc., Korea; skypel G-2555) in order to form Na⁺O complex salt terminuses. The result elastomer was then reacted with polycarbonate (of Polyscience Inc., molecular weight: 20,000–25,000) which had been prepared by employing phosgene process and had —Cl terminuses, thereby providing a block copolymer. 0.2 g of NK 2014 of cyanides of Japanese photosensitive colorants was dissolved in 20 ml of $CHCl_3$. This colorant solution was then dispersed in 2 g of the block copolymer resin which was, thereafter, coated on the back-coated PET film of Example 1 in the same manner as described in Example 1, thereby providing an organic-optic recording tape. A laser beam of 6 mW power outputted from the laser diode of 830 nm wavelength was focused on the complex functional layer for 0.1 μsec in order to form a bump and write data. This bump had about 0.9 μm of diameter and about 0.16 μm of height. Thereafter, the laser diode was controlled to output a laser beam of 11 mW power which was focused on the complex functional layer for 0.2 μsec so as to erase data recorded on the layer.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

We claim:

1. An organic-optic recording tape, consisting essentially of:

a backcoating layer;

a base film coated on said backcoating layer; and a complex functional layer coated onto said base film;

said complex functional layer being a single polymeric layer formed of a thermoplastic elastomer and a viscoelastic transparent thermoplastic polymer, with near-infrared absorbing organic colorants dispersed therein, the colorants capable of generating heat from 110°–120° C. when subjected to infrared radiation; wherein the thermoplastic elastomer has a melting point of at least 200° C., a glass transition temperature of 0° C. or less, and viscoelasticity in a temperature range from about room temperature to about data therefrom, and to rewrite data thereon upon selective heating by laser beams of different powers outputted from a single laser source; wherein said complex functional layer generates a bump while recording data thereon and eliminates said bump while erasing said data.

2. An organic-optic recording tape according to claim 1, wherein said complex functional layer is made of a polymer blend of the thermoplastic elastomer and the viscoelastic transparent thermoplastic polymer.

3. An organic-optic recording tape according to claim 1, wherein said complex functional layer comprises about 2–25% by weight of said colorants.

4. An organic-optic recording tape according to claim 1, wherein said single laser source is a laser diode.

5. An organic-optic recording tape according to claim 1, wherein the colorants are capable of absorbing a laser beam and generating heat to heat the complex functional layer.

6. An organic-optic recording tape according to claim 1, wherein the complex functional layer comprises said bump containing recorded data.

7. An organic-optic recording tape according to claim 6, wherein the bump on the complex functional layer is capable of being eliminated while erasing data from the recording tape.

8. An organic-optic recording tape according to claim 6, wherein the bump on the complex functional layer and a normal part of the complex functional layer are capable of generating different reflectivity when said data is read.

9. An organic-optic recording tape according to claim 1, wherein said complex functional layer is made of a block copolymer of the thermoplastic elastomer and the viscoelastic transparent thermoplastic polymer.

10. An organic-optic recording tape, comprising:

a backcoating layer;

a base film coated on said backcoating layer; and a complex functional layer coated onto said base film;

wherein the tape consists essentially of a single polymeric layer for recording data, said single polymeric layer being said complex functional layer;

said complex functional layer being formed of a thermoplastic elastomer and a viscoelastic transparent thermoplastic polymer, with near-infrared absorbing organic colorants dispersed therein, the colorants capable of generating heat from 110°–120° C. when subjected to infrared radiation; wherein the thermoplastic elastomer has a melting point of at least 200° C., a glass transition temperature of 0° C. or less, and viscoelasticity in a temperature range from about room temperature to about 200° C.; and the transparent thermoplastic polymer has a melting point of at least 200° C., and a glass transition temperature of about 130°–150° C.; and said complex functional layer being adapted to write data thereon, to read said data therefrom, to erase said data therefrom, and to rewrite data thereon, by indirect heating by laser beams of different powers outputted from a single laser source wherein said complex functional layer is capable of generating a bump while recording data thereon and of eliminating said bump while erasing said data.

* * * * *

UNITED STATES PATENT AND TRADEMARK OFFICE
CERTIFICATE OF CORRECTION

PATENT NO. : 5,508,087

DATED : April 16, 1996

INVENTOR(S): Kyung S. Min, Geon Y. Kim and Ok K. Cho

It is certified that error appears in the above-identified patent and that said Letters Patent is hereby corrected as shown below:

Title page, item 75, Inventors, delete "both of Kyunski-do" after the name "Cho" and insert --Suwon-Si-- after the name "Kim", insert --Euiwang-Si-- after the name "Cho"

Claim 1, line 14, column 7, line 63, delete "data" after the word "about"

Claim 1, lines 1 to 12, column 8, lines 1 to 6, delete "therefrom, and to rewrite data thereon upon selective heating by laser beams of different powers outputted from a single laser source; wherein said complex functional layer generates a bump while recording data thereon and eliminates said bump while erasing data"

after the word "about" insert --200°; and the transparent thermoplastic polymer has melting point of at least 200°C, and a glass transition temperature of about 130-150°C; said complex functional layer being adapted to write data thereon, to read said data therefrom, to erase said data therefrom, and to rewrite data thereon upon indirect heating by laser beams of different powers outputted from a single laser source; wherein said complex functional layer is capable of generating a bump while recording data thereon and of eliminating said bump while erasing said data--

Line 9, column 4, line 64, "wrote" should read --written--

Signed and Sealed this

Fifth Day of August, 1997

Attest:

BRUCE LEHMAN

*Attesting Officer*   *Commissioner of Patents and Trademarks*